Patented July 5, 1932

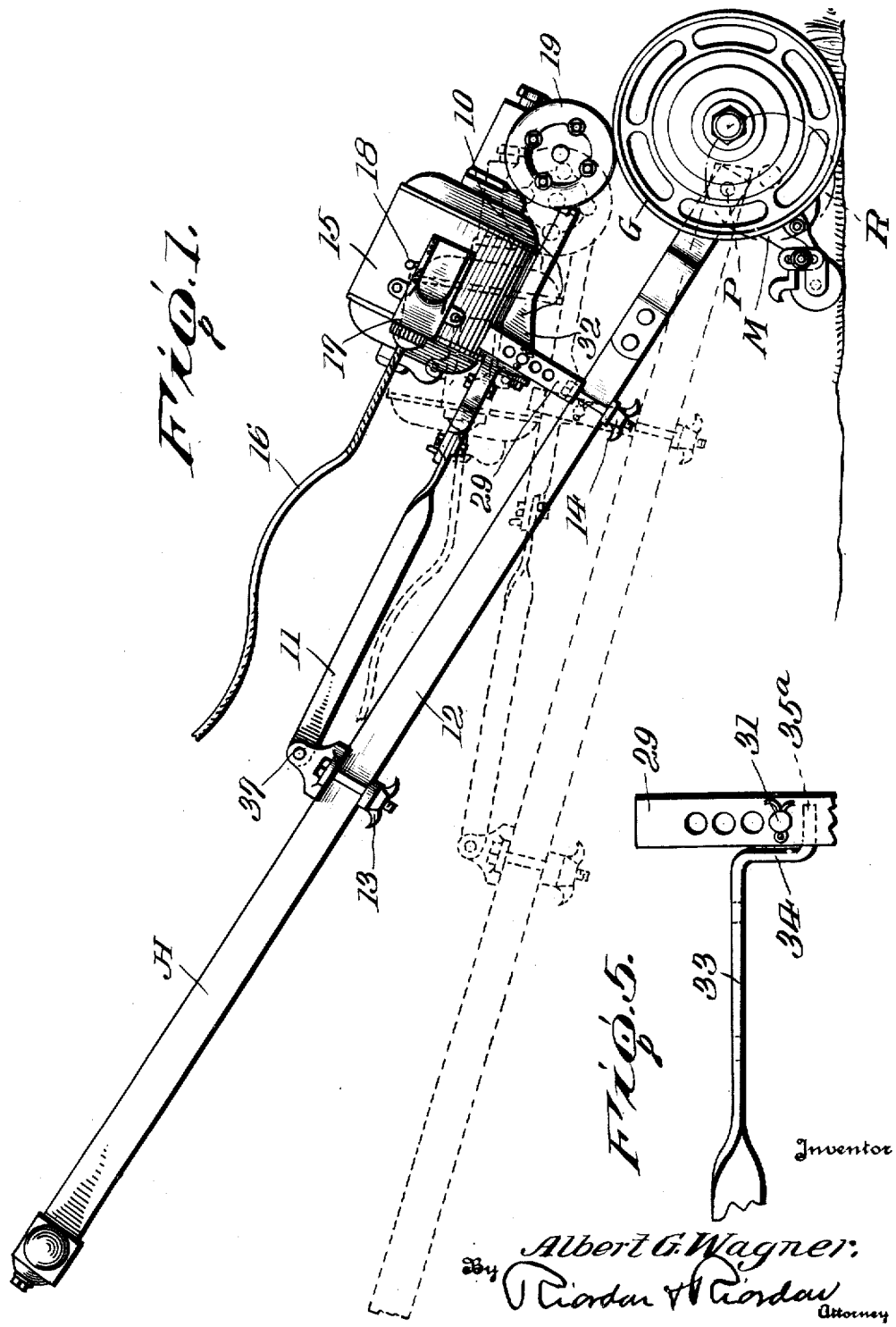

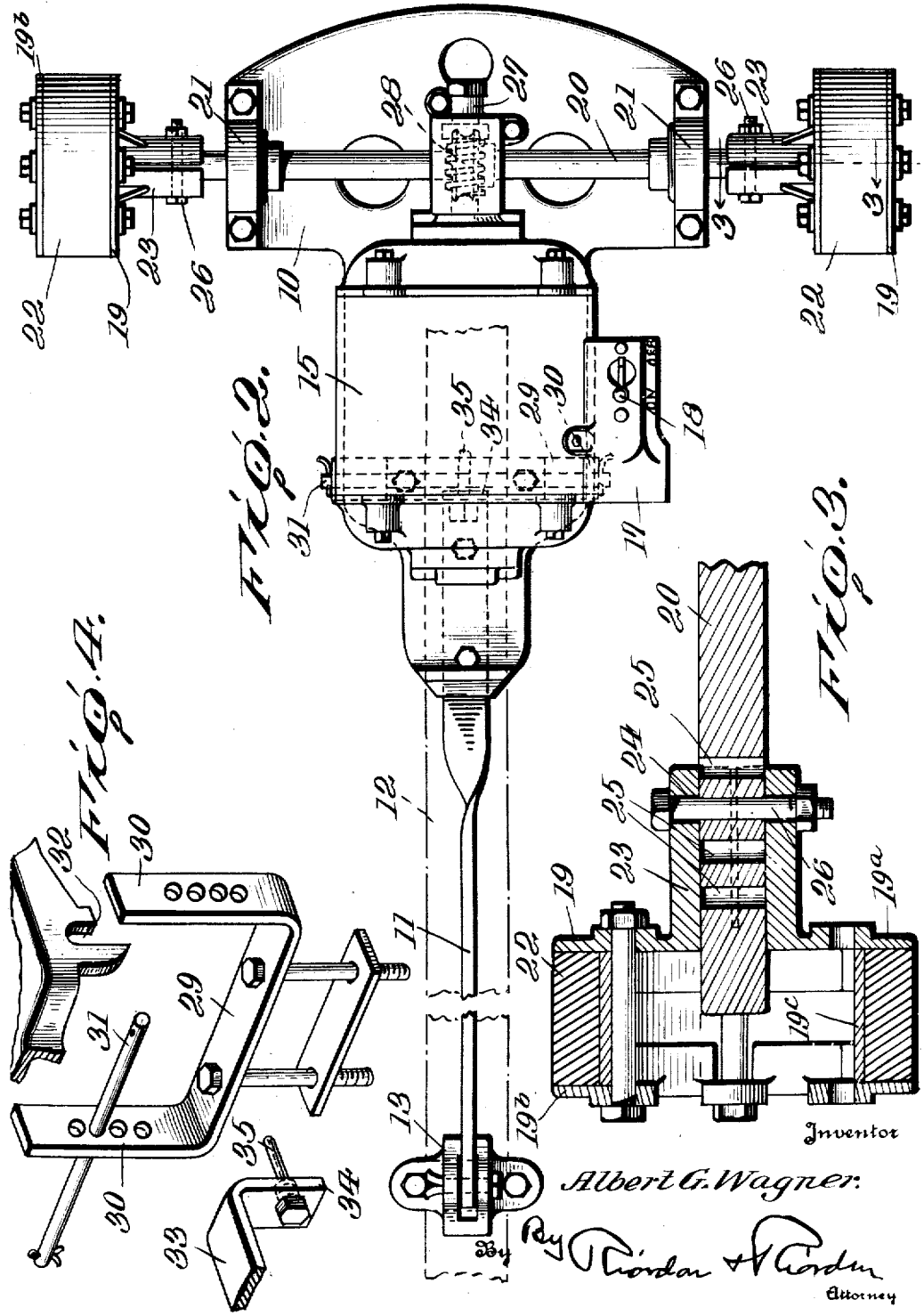

1,866,380

UNITED STATES PATENT OFFICE

ALBERT G. WAGNER, OF CINCINNATI, OHIO, ASSIGNOR TO THE GLOW ELECTRIC COMPANY, OF CINCINNATI, OHIO, A CORPORATION OF OHIO

LAWN MOWER

Application filed October 8, 1930. Serial No. 487,328.

The present invention relates to lawn mowers and more particularly to an electric power attachment that can be mounted on any conventional make or size of ordinary hand lawn mower to propel the same, without in any way altering the mower for reception of the power attachment.

Power driven mowers are of course, well known, and it is also not new to convert hand mowers into power driven units, but heretofore it has been customary to form a more or less permanent unit utilizing gears or the like between the source of power and the driven members.

The attachment of the present invention is designed for ready placement, and removal from the mower by the mere adjustment of a pair of clamps.

One of the objects of this invention resides in the provision of control means effective to instantly apply or remove application of power to the mower without necessitating any lever or control mechanism other than the conventional lawn mower handle.

Another object contemplates a control of the application of power to the mower and discontinuance thereof merely by lowering or raising the handle of the mower.

To the attainment of the above and other objects which will appear as the description proceeds, reference may be had to the accompanying drawings, wherein like elements are designated by like numerals, and in which Fig. 1 is a side elevation of a lawn mower with the attachment thereon;

Fig. 2 is a top plan of the attachment;

Fig. 3 is a detail elevation in section on the line 3—3 of Fig. 2;

Fig. 4 is a perspective view of certain elements of the device in dis-assembled relation; and Fig. 5 is a fragmentary detail showing a modification of one element of Fig. 4.

Referring more particularly to the drawings it will be noted that the attachment comprises a supporting plate or frame 10 having a longitudinal arm or strut 11 extending therefrom. The frame 10 is substantially T-shaped in outline, the cross or T portion being of a size to fit well within the wheels of a conventional lawn mower indicated generally at M and having a handle H.

A clamp 13 serves to attach the arm 11 to the handle H at a point approximately intermediate its ends while a clamp 14 located below the supporting plate 10, acts as a support or mounting for the attachment at a point on the handle H, adjacent the body of the mower. A motor 15 which serves as a source of power is mounted above the clamp 14 on the plate 10, receiving its current from any convenient supply of electricity, a conductor 16 and a plug-in socket 17 being provided for the purpose. 18 designates a switch on the motor for controlling current thereto.

Friction wheels 19 are mounted on a shaft or axle 20, which shaft is supported in bearings 21 at the ends of the T portion of the plate 10, and these wheels will preferably have rubber traction surfaces 22 which may or may not be corrugated depending upon conditions. An adjustable connection between the wheels 19 and the shaft 20 will serve to permit an effectual lengthening or shortening of the distance between the traction wheels to permit adaptation of the device to mowers having different wheel spread and such connection may readily take the form illustrated in Fig. 3 in which a hub 23 is extended from a wheel 19 and provided with a pair of oppositely disposed openings 24 adapted to cooperate with one of a series of holes 25 arranged in each end of the shaft 20. A bolt 26 may be used to maintain a definite relation between each wheel 19 and its respective end of axle 20.

While any simple form of wheel may be utilized, the structure illustrated in Fig. 3 provides a very sturdy and rugged structure, it being observed that the wheel comprises a flange 19a integral with the hub 23 and a flange 19b spaced from flange 19a by a collar 19c. The traction element 22 may be slipped over the collar 19c and the flange or ring 19b then bolted to the flange 19a to hold the assembled wheel together. The motor 16 will desirably be mounted with its shaft 27 extending at right angles to the axle 20 and a worm drive 28 will suffice to connect the two shafts. This mounting is, of course merely suggestive and the motor may if desired be located in any other desired relation, for example, the motor might be located between the wheels with the ends of its shaft forming the wheel axle; the present embodiment is but suggestive of a preferred form.

The clamp 14 consists of two members arranged to grip the handle 12 on opposite sides thereof, being connected by bolts, and the upper clamping member 29 will be formed in a U-shape having upwardly extending perforated arms 30. A pin 31 is provided to connect the arms 30, the perforations serving as a means of height adjustment for the pin 31. The plate 10 has attached thereto, or formed thereon, lugs 32 extending downwardly, the lugs being grooved to receive, and rest upon the pin or bar 31.

A latch comprising angle bar 33 having a down-turned portion 34 is located on the lower side of the frame 10 and provided with an adjustable pin 35 so arranged that it may be extended between the clamping member 29 and the bar 31. The purpose of this pin is to prevent complete dis-engagement of the attachment from the mower handle in certain adjusted positions thereof as set forth hereinafter. This latching means may take various forms, Fig. 5 illustrating a slightly modified embodiment in which the portion 34 of the angle iron 33 is provided with an integral extension 35a. Except for the fact that no adjustability is possible in this form, it will be observed that the portion 35a functions in the same manner as the pin 35 of Fig. 4.

Having thus described my invention, the operation and use thereof will be readily apparent. The attachment is placed on the mower with the traction wheels 19 resting on the ground wheels G slightly to the rear of the top center of the wheels G, and the clamps 13 and 14 secured in place. It will be noted that the clamp 14 is separate from the plate 10, and that the lugs 32 together with the bar 31 function as a pivotal support for the attachment, the arm 11 being pivotally attached to the clamp 13 as indicated at 37. The wheels 19 and the pin 31 will be adjusted to adapt the attachment to the particular mower with which it is to be used. The adjustment of pin 31 is such that when the mower handle H is in raised position the wheels 19 will rest upon and engage the ground wheels G in driving relation. When the handle H is lowered as indicated in Fig. 1, such action will serve to break the engagement between wheels 19 and G thereby removing the application of power to the mower, so that after the attachment is mounted in position, the lawn mower may be started or stopped by raising or lowering the handle, such movement of the handle being about the usual pivot P.

The pin 35 (or 35a) supported by the frame 10 will be located, when the attachment is assembled on the mower, between the pin 31 and the clamp portion 29 and will serve to prevent complete detachment of the device from the clamp 14, in the event that the mower handle H is raised too high about the wheel 19 as a pivot.

It is understood, of course, that the cutting reel R of the mower will be put into operation through its own driving pawls by action of the ground wheels G just as though the mower were being pushed by hand.

The current to the motor is through the conductor 16, when once turned on at the switch 18 need not be cut off until the operator is through using the mower. This is possible because of the arrangement by means of which the traction wheels are placed into or out of engagement with the ground wheels of the mower, it being possible to stop the mower without discontinuing operation of the motor. This arrangement is particularly advantageous in cases where a gasoline motor is used rather than an electric motor.

A unit such as described in this application may be carried in stock by any hardware merchant and can be applied to any conventional hand lawn mower regardless of make or size. If the mower is to be used in a locality where electricity is not available a small gasoline motor or other equivalent source of driving power may be utilized in lieu of the motor 15.

Having thus described my invention, what I claim as new and desire to secure by Letters Patent of the United States, is:—

1. An attachment, for a lawn mower having a movable handle, comprising a power unit, means to detachably mount said unit on the lawn mower handle, and means, on said handle, effective by movements of the handle, to apply and remove the power from said unit to the mower to propel the same.

2. An attachment, for a lawn mower having a movable handle, comprising a body member, a power wheel thereon, means to drive said wheel, and a pair of clamps for attaching said body member to the handle of a lawn mower, whereby said power wheel will be moved into engagement with a ground wheel of the mower, by movement of the handle in one direction relative to said ground wheel.

3. An attachment, for a lawn mower having a movable handle, comprising a body member, a power wheel thereon, means to drive said wheel, a pair of clamps for attaching said body member to the handle of a lawn mower, whereby said power wheel will be moved into engagement with a ground wheel of the mower, by movement of the handle in one direction relative to said ground wheel and means to adjust said power wheel transversely of the mower.

4. An attachment, for a lawn mower having a movable handle, comprising a body member, a power wheel thereon, means to drive said wheel, a pair of clamps for attaching said body member to the handle of a lawn mower, whereby said power wheel will be moved into engagement with a ground wheel of the mower, by movement of the handle in one direction relative to said ground wheel and means to adjust the position of said attachment relative to the mower.

5. An attachment, for a lawn mower having a movable handle, comprising a body member, a power wheel thereon, means to drive said wheel, a pair of clamps for attaching said body member to the handle of a lawn mower, whereby said power wheel will be moved into engagement with a ground wheel of the mower, by movement of the handle in one direction relative to said ground wheel, means to adjust said power wheel transversely of the mower, and means to adjust the position of said attachment relative to the mower.

6. An attachment, for a lawn mower having a movable handle, comprising a body member, a power wheel thereon, means to drive said wheel, a pair of clamps for attaching said body member to the handle of a lawn mower, whereby said power wheel will be moved into engagement with a ground wheel of the mower, by movement of the handle in one direction relative to said ground wheel, means to adjust the position of said attachment relative to the mower, means to limit said adjustment.

7. The combination with a lawn mower having a ground wheel and a handle, of a power unit, means to detachably mount said unit on said handle, for movement therewith, said unit having an element engageable with the ground wheel in one position of the handle thereby to apply power from said unit to the mower.

8. The combination with a lawn mower having a movable handle, of a power unit, means to detachable mount said unit on the handle for movement therewith, and means movable with the handle to apply power from said unit to the mower to drive the same when said handle is in one position, and to disconnect the unit from the mower when the handle is moved to another position.

9. The combination with a lawn mower having a handle, of a motor, means to detachably mount said motor on the lawn mower handle, means movable with the handle to connect said motor to the mower when the handle is in one position and to disconnect the motor from the mower when the handle is moved to another position, during continuous operation of the motor.

10. The combination with a lawn mower having ground wheels and a pivoted handle, of a power unit therefor, comprising a body member, means to mount said member on the handle, and means on said handle, including a power driven wheel on said member located to engage a ground wheel when the handle is in one position and to clear said ground wheel when the handle is in another position.

11. The combination with a lawn mower having ground wheels and a pivoted handle, of a power unit therefor, comprising a body member, means to mount said member on the handle including an adjustable pivot engageable with said body member, and a power driven wheel on said member engageable with a ground wheel, the position of said unit, relative to the mower being determined by said adjustable pivot, and the position of said handle.

12. The combination with a lawn mower having ground wheels and a pivoted handle, of a power unit therefor, comprising a body member, means to mount said member on the handle including an adjustable pivot engageable with said body member, and a power driven wheel on said member engageable with a ground wheel, the position of said unit, relative to the mower being determined by said adjustable pivot, and the position of said handle, and means to prevent detachment of said body member from said adjustable pivot.

13. In a lawn mower having a ground wheel and a handle mounted for pivotal movement about an axis spaced from the axis of said ground wheel, a power unit, and means to mount said unit wholly on the handle for movement therewith, into and out of engagement with said ground wheel whereby movement of the handle in one direction will apply power from the unit to the mower to propel the same.

14. In a lawn mower having a ground wheel and a handle mounted for pivotal movement about an axis spaced from the axis of said ground wheel, a power unit, and means mounting said unit wholly on the mower handle in such position that movement of the handle in one direction will apply power from the unit to the mower to propel the same and movement of the handle in the other direction will remove the application of power.

15. In a lawn mower having a ground wheel and a handle mounted for pivotal movement about an axis spaced from the axis of said ground wheel, a power unit having a traction wheel, and means to mount said unit wholly on the handle for movement therewith whereby movement of the handle in one direction will place said traction wheel in engagement with said ground wheel.

16. In a lawn mower having a ground wheel and a handle mounted for pivotal movement about an axis spaced from the axis of said ground wheel, a power unit having a traction wheel, and means mounting said unit on the mower handle in such position that movement of the handle in one direction will place said traction wheel in engagement with said ground wheel, and movement of the handle in another direction will disengage said traction and ground wheels.

17. The combination with a lawn mower having ground wheels movable about one axis, and a handle pivoted for movement about another axis, of a power unit, means to detachably mount said unit on said handle, for movement therewith, said unit having an element engageable with the ground wheel in one position of the handle, thereby to apply power from said unit to the mower.

18. The combination with a lawn mower having ground wheels movable about one axis and a handle pivoted for movement about another axis and through a vertical plane from a lowered position when the mower is at rest into a raised position for propelling the mower, of a power unit, means to mount said unit wholly on said handle, and means including said handle to apply power from said unit to the ground wheels of the mower, when the handle is in its raised propelling position, and to remove application of power when said handle is in its lower position of rest.

In testimony whereof I affix my signature.

ALBERT G. WAGNER.

CERTIFICATE OF CORRECTION.

Patent No. 1,866,380.  July 5, 1932.

ALBERT G. WAGNER.

It is hereby certified that error appears in the printed specification of the above numbered patent requiring correction as follows: Page 3, line 45, claim 8, for "detachable" read detachably; page 4, line 2, claim 16, after "unit" insert the word wholly; and that the said Letters Patent should be read with these corrections therein that the same may conform to the record of the case in the Patent Office.

Signed and sealed this 27th day of September, A. D. 1932.

(Seal)

M. J. Moore,
Acting Commissioner of Patents.

having a traction wheel, and means mounting said unit on the mower handle in such position that movement of the handle in one direction will place said traction wheel in engagement with said ground wheel, and movement of the handle in another direction will disengage said traction and ground wheels.

17. The combination with a lawn mower having ground wheels movable about one axis, and a handle pivoted for movement about another axis, of a power unit, means to detachably mount said unit on said handle, for movement therewith, said unit having an element engageable with the ground wheel in one position of the handle, thereby to apply power from said unit to the mower.

18. The combination with a lawn mower having ground wheels movable about one axis and a handle pivoted for movement about another axis and through a vertical plane from a lowered position when the mower is at rest into a raised position for propelling the mower, of a power unit, means to mount said unit wholly on said handle, and means including said handle to apply power from said unit to the ground wheels of the mower, when the handle is in its raised propelling position, and to remove application of power when said handle is in its lower position of rest.

In testimony whereof I affix my signature.

ALBERT G. WAGNER.

CERTIFICATE OF CORRECTION.

Patent No. 1,866,380.

July 5, 1932.

ALBERT G. WAGNER.

It is hereby certified that error appears in the printed specification of the above numbered patent requiring correction as follows: Page 3, line 45, claim 8, for "detachable" read detachably; page 4, line 2, claim 16, after "unit" insert the word wholly; and that the said Letters Patent should be read with these corrections therein that the same may conform to the record of the case in the Patent Office.

Signed and sealed this 27th day of September, A. D. 1932.

(Seal)

M. J. Moore,
Acting Commissioner of Patents.

CERTIFICATE OF CORRECTION.

Patent No. 1,866,380.                                                              July 5, 1932.

ALBERT G. WAGNER.

It is hereby certified that error appears in the printed specification of the above numbered patent requiring correction as follows: Page 3, line 45, claim 8, for "detachable" read detachably; page 4, line 2, claim 16, after "unit" insert the word wholly; and that the said Letters Patent should be read with these corrections therein that the same may conform to the record of the case in the Patent Office.

Signed and sealed this 27th day of September, A. D. 1932.

(Seal)                                                         M. J. Moore,
                                                                     Acting Commissioner of Patents.